United States Patent Office 2,811,625
Patented Oct. 29, 1957

2,811,625

HOT WORKING OF TITANIUM ALLOY WELDS

Alfred W. Klein, Pittsburgh, Pa., assignor, by mesne assignments, to the United States of America as represented by the Secretary of the Navy No Drawing. Application July 9, 1956,
Serial No. 596,804

3 Claims. (Cl. 219—117)

This invention relates to a method for making welds of titanium alloy.

In many industries it is often desirable to use titanium alloys because of their attractive physical properties. However, the difficulties encountered in welding have seriously limited their use. The various conventional welding process do not yield an acceptable product. Of these methods the best results have been obtained from the inert gas-arc welding process. The joints produced by the inert gas-arc method are strong, but extremely brittle. This brittleness has not been reduced by any known method of heat treatment. Therefore, the weldment is useless since no ductility can be effected.

The instant invention allows the welding of titanium alloys to produce a joint that is both strong and ductile. The joint is first welded by the inert gas-arc method and then the joint is subjected to the action of a conventional resistance seam welder.

It is an object of this invention to provide a method for the welding of titanium alloys wherein the weldment is both strong and ductile.

Other objects and many of the attendant advantages of this invention will be readily appreciated as the same becomes better understood by reference to the following detailed description.

In practicing the invention two sheets containing titanium alloys are butt welded by the inert gas-arch method using filler rod. The joint thus produced is strong but brittle. The next step is to subject the joint to a resistance seam welder. The wheels of the resistance seam welder are allowed to run over the entire length of the joint under a continuous firing cycle and a predetermined speed. Thus, by the appropriate control of heat and pressure, the weld metal and the heat affected zones are hot worked. As a result of the hot working process, the weld structure is transformed into a fine grained material with properties similar to those of the parent wrought metal. A noticeable improvement in the ductility of the joint results from the hot working process.

It is not intended that the disclosed process be limited only to titanium alloys. Weldments in other materials, which are now furnace heat treated, could be effectively stress-relieved and annealed by the hot working process.

Obviously many modifications and variations of the present invention are possible in the light of the above teachings. It is therefore to be understood that within the scope of the appended claims the invention may be practiced otherwise than as specifically described.

What is claimed is:

1. The method of welding metals which comprises butt welding two sheets of metal by an inert gas-arc method and passing the resulting joint under the wheels of a resistance seam welder under appropriate heat and pressure.

2. The method of welding metals containing titanium alloys which comprises combining two sheets of metal containing titanium alloy into a joint by butt welding and then running the wheels of a resistance seam welder under appropriate heat and pressure over the entire length of the joint.

3. The method of welding metals containing titanium alloys which comprises the butt welding of sheets of metal containing titanium alloy into a joint by the inert gas-arc method and then running the wheels of a resistance seam welder under appropriate heat and pressure over the entire length of the joint.

References Cited in the file of this patent

UNITED STATES PATENTS

| | | |
|---|---|---|
| 1,535,586 | Eschholz | Apr. 28, 1925 |
| 2,474,023 | Wyer | June 21, 1949 |